United States Patent [19]

Hendry

[11] Patent Number: 4,750,409
[45] Date of Patent: Jun. 14, 1988

[54] APPARATUS FOR COMPRESSING A GAS

[75] Inventor: James W. Hendry, Spring Hill, Fla.

[73] Assignee: Michael Ladney, Jr., Sterling Heights, Mich.

[21] Appl. No.: 5,122

[22] Filed: Jan. 20, 1987

[51] Int. Cl.⁴ ............................................. F01B 31/00
[52] U.S. Cl. ....................................... 92/158; 92/159
[58] Field of Search ................. 92/153, 159, 158, 249

[56] References Cited

U.S. PATENT DOCUMENTS

| | | | |
|---|---|---|---|
| 251,373 | 12/1881 | Lount . | |
| 742,784 | 10/1903 | Fraley . | |
| 1,665,965 | 4/1928 | Koenig | 92/159 |
| 2,665,901 | 1/1954 | Patterson | 92/153 X |
| 3,423,940 | 1/1969 | Brand | 92/249 X |
| 3,636,824 | 1/1972 | Clark | 92/249 |
| 3,678,809 | 7/1972 | Doult | 92/249 X |

*Primary Examiner*—Alan Cohan
*Attorney, Agent, or Firm*—Brooks & Kushman

[57] ABSTRACT

An apparatus for compressing a gas includes a preferably substantially vertically oriented cylinder body, having a longitudinally extending bore with a wall, and a preferably substantially vertically oriented piston adapted for reciprocating movement in the cylinder bore. The piston includes a piston head preferably having a substantially horizontally oriented top face and a seal groove extending around the periphery of the piston head and spaced from the piston head top face. At least one fluid passage extends in the piston head from the top face thereof to the seal groove. A seal member is positioned in the groove and has an outer face adapted to contact the cylinder inner wall. A layer of a lubricant is provided on the piston head top face. An inlet aperture is provided for allowing a gas to enter the cylinder above the piston head. A movement member is provided to urge the piston upwardly and compress the gas. This pressurizes the lubricant, a portion of which flows through the fluid passage and into the seal groove to urge the seal member against the cylinder bore wall.

19 Claims, 2 Drawing Sheets

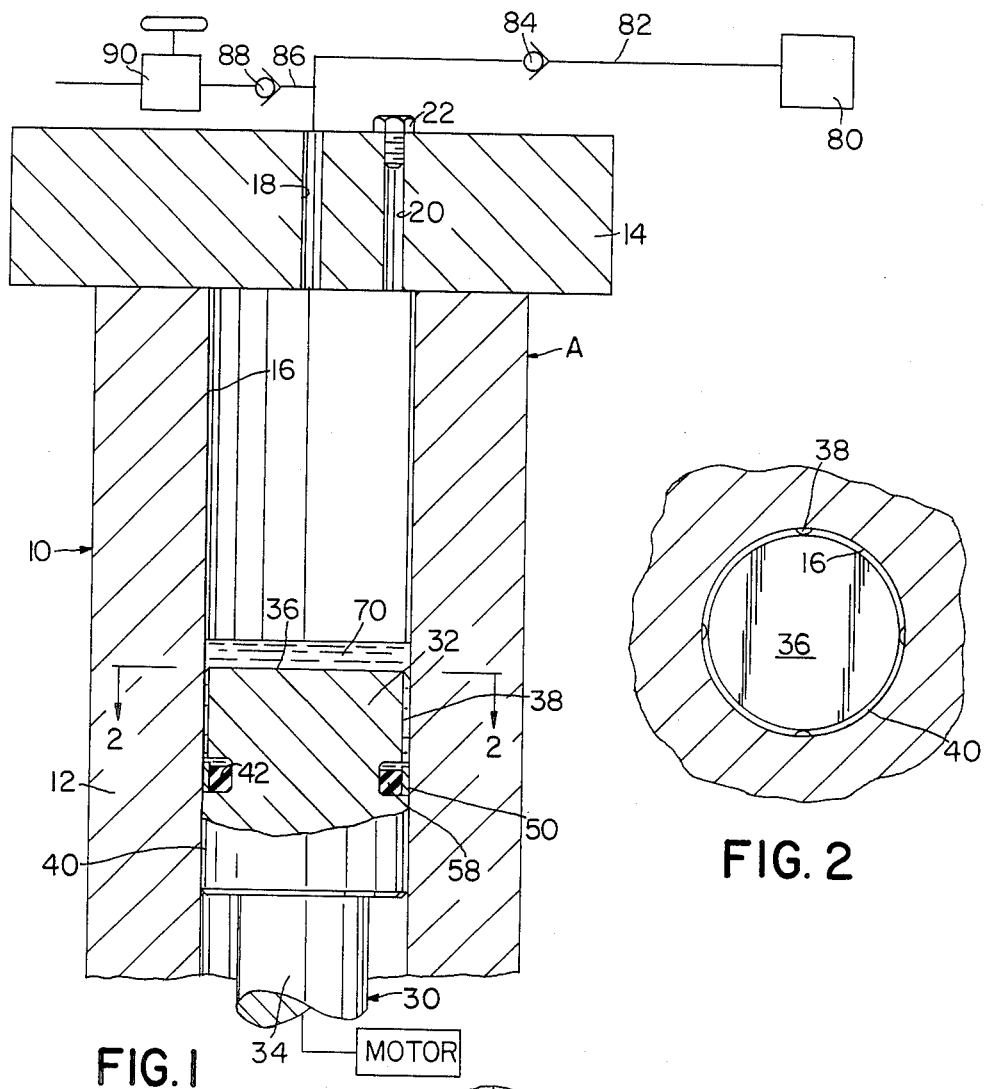
FIG. 1
FIG. 2
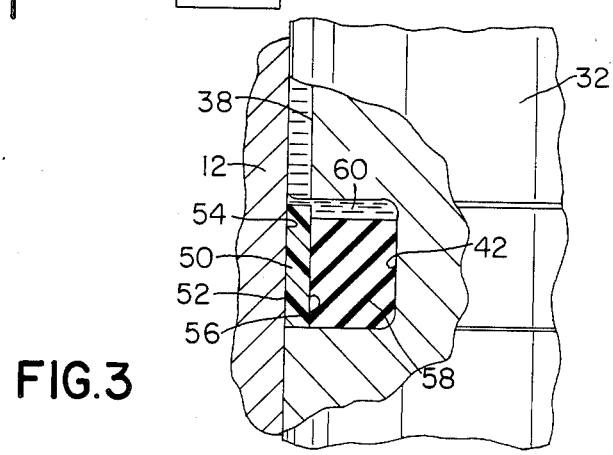
FIG. 3

APPARATUS FOR COMPRESSING A GAS

CROSS-REFERENCE TO RELATED APPLICATIONS

This application is related to U.S. patent applications entitled "APPARATUS AND METHOD FOR THE INJECTION MOLDING OF THERMOPLASTICS", U.S. Ser. No. 071,363, filed July 9, 1987 and "VARIABLE VOLUME RESERVOIR AND METHOD FOR ITS USE", U.S. Ser. No. 071,377, filed July 9, 1987, both of which have the same Assignee as the present application.

BACKGROUND OF THE INVENTION

This invention relates generally to seal assemblies. More specifically, the present invention relates to an apparatus for sealing between a piston and a cylinder.

Although the invention will be described with particular reference to a lubricating and sealing arrangement in a gas compressor or pressurizing pump in which a substantially vertically oriented piston head reciprocates in a substantially vertically oriented cylinder, it will be recognized that certain features thereof may be used or adapted for use with piston and cylinder lubricating and sealing arrangements in other environments as well.

At present, the conventional means for accomplishing a seal in a gas pressurizing piston and cylinder assembly is by way of compression seals. Such seals are provided on the reciprocating member and urged against the stationary member. Although a lubricant may be initially applied to the internal surface of the piston and cylinder assembly during the manufacture of the cylinder, the lubricant has a short life. Since no additional lubrication is provided, however, seal wear is fairly rapid. Because only a so-called "dry" (i.e. non-lubricated) seal is provided in such conventional gas pressurizing apparatus, seal life is fairly short. Consequently, the cylinder and piston assembly as a whole, has a relatively short life.

Accordingly, it has been considered desirable to develop a new and improved piston and cylinder sealing and lubricating assembly which would overcome the foregoing problems and others while providing better and more advantageous overall results.

BRIEF SUMMARY OF THE INVENTION

An apparatus constructed according to the present invention allows the sealing of a piston adapted to reciprocate in a cylinder to compress a gas.

More particularly in accordance with the invention, the apparatus comprises a preferably vertically oriented cylinder body having a longitudinally extending bore therein with a wall, and a preferably vertically oriented piston, which is adapted for reciprocating movement in the cylinder bore. The piston includes a piston head preferably having a substantially horizontally oriented top face. A seal groove extends around a periphery of the piston head and is spaced from the piston head top face. At least one fluid passage extends from the piston head top face to the seal groove. A seal member is positioned in the seal groove and has an outer face adapted to contact the wall of the cylinder bore as well as an inner face. A layer of lubricant is provided on the piston head top face. Inlet means are provided for allowing the gas to enter the cylinder above the piston. Movement means for urging the piston upwardly to compress the gas and to pressurize the lubricant are also provided. A portion of the pressurized lubricant flows through the fluid passage and into the seal groove during the compression of the gas to urge the seal member against the cylinder bore wall.

In accordance with another aspect of the invention, an outlet means is provided for allowing the gas to exit the cylinder.

In accordance with still another aspect of the invention, the apparatus further comprises a storage means secured to the piston head top face for storing the lubricant. Preferably, the storage means is a sintered metal disk.

According to another aspect of the invention, the lubricant is a liquid. Preferably, the lubricant liquid is an oil, such as a hydraulic oil.

According to a further aspect of the invention, the apparatus further comprises an inlet aperture in the cylinder to allow additional lubricant to be deposited on the piston head top face.

According to still another aspect of the invention, a resilient backup seal member is provided in the groove and adapted to contact the seal inner face.

According to yet another aspect of the invention, four fluid passages extend from the piston head top face to the seal groove with the fluid passages being equally spaced apart on the piston head.

According to yet a further aspect of the invention, the seal member is a seal ring.

According to a still further aspect of the invention, the assembly is capable of accomodating gas at pressures from 1,000 psi up to 10,000 to 20,000 psi in the cylinder body and of confining the gas on one side of the seal member.

One advantage of the invention is the provision of a new and improved apparatus for sealing a piston adapted to reciprocate in a cylinder to compress a gas.

Another advantage of the invention is the provision of a sealing apparatus which prevents gas leakage over a pressure range from 1,000 psi up to 20,000 psi.

Still another advantage of the invention is the provision in a gas pressurizing piston and cylinder apparatus of a lubrication feature through which the seals are lubricated to assure that the apparartus has a long life with minimum maintenance.

Yet another advantage of the present invention is the provision of a lubricant refill capability in the apparatus to allow additional lubricant to be added in the cylinder thus further extending the life of the assembly.

Still other benefits and advantages of the invention will become apparent to those skilled in the art upon a reading and understanding of the following detailed description.

BRIEF DESCRIPTION OF THE DRAWINGS

The invention may take physical form in certain parts and arrangements of parts preferred and alternate embodiments of which will be described in detail in this specification and illustrated in the accompanying drawings which form a part hereof, and wherein:

FIG. 1 is a side elevational view of a gas pressurizing cylinder and piston assembly in partial cross section according to the preferred embodiment of the present invention;

FIG. 2 is a fragmentary sectional view of the assembly taken along line 2—2 of FIG. 1;

FIG. 3 is an enlarged side elevational view in partial cross section of a piston seal groove and seal assembly portion of FIG. 1;

DETAILED DESCRIPTION OF THE PREFERRED AND ALTERNATE EMBODIMENTS

Figure 5:
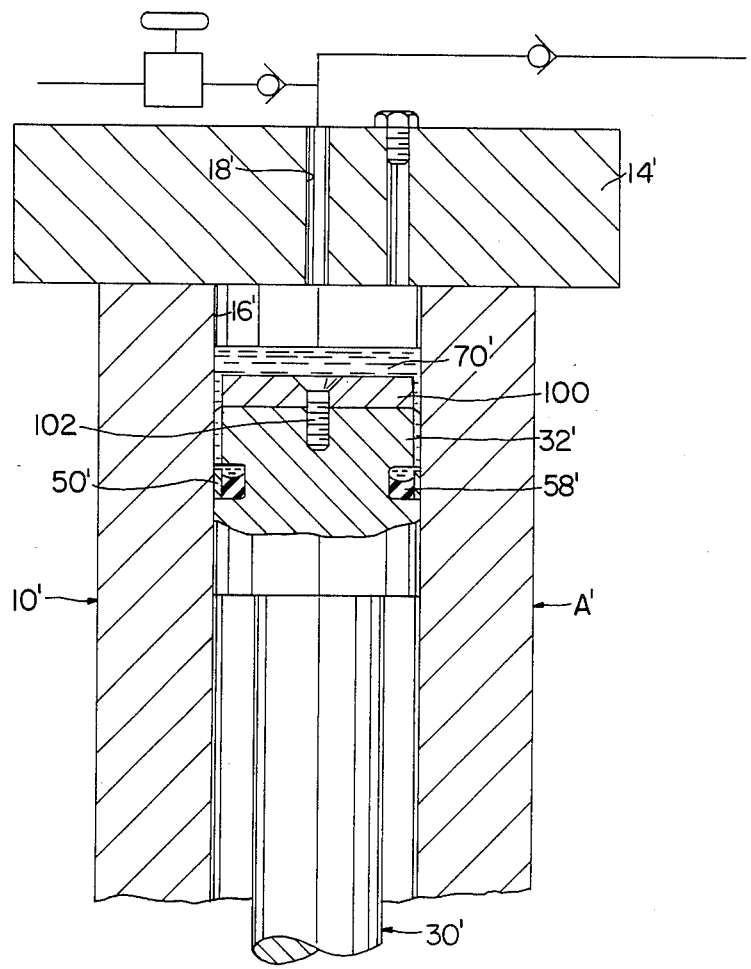
FIG. 5 is a side elevational view in partial cross section of a pressurizing cylinder and piston assembly according to an alternate embodiment of the present invention.

Referring now to the drawings wherein the showings are for purposes of illustrating preferred and alternate embodiments of the invention only and not for purposes of limiting same, FIG. 1 discloses an assembly A which is utilized to compress a gas. The invention is particularly applicable to a vertically oriented piston and cylinder assembly, but it will be appreciated by those skilled in the art that the invention has broader application and may be adapted for use in other environments.

The assembly preferably comprises a cylinder 10 including an annular side wall 12 and a disc-like top wall 14 with a bore 16 being defined in the cylinder. A gas inlet/outlet aperture 18 extends through the top wall 14 so as to communicate with the bore 16. Similarly, a lubricant refill aperture 20 extends through the top wall 14 in spaced relation to the inlet/outlet aperture 18. The lubricant refill aperture 20 is closed by a conventional threadable plug 22.

A piston 30 is adapted to reciprocate in the cylinder bore 16. The piston comprises a piston head 32 and a piston shaft 34 to which is connected a suitable conventional movement means such as a motor which is only illustrated schematically. The head 32 includes a top face 36 as well as at least one fluid passage in the form of a lubricant groove 38. Although four such grooves are shown as extending along an outer periphery 40 of the piston head 32 in FIG. 2, it should be recognized that more or less than the illustrated number of lubricant grooves may be provided. These groove 38 extend from the piston top face 36 to a seal groove 42 provided on the piston head outer periphery in spaced relation to the top face. The grooves allow lubricant to flow from the piston top face into the seal groove. However, it should be recognized that fluid passages are not restricted to extending along the outer periphery of the piston head 32. In other words, communication between the piston top face and the seal groove can also be occasioned by the use of bores (not illustrated) provided in the piston head and terminating at one end at the piston head top face and at the other end at the seal groove.

With reference now also to FIG. 3, a primary seal means can be an annular member 50 that is positioned in the piston head seal groove 42 and includes an outer face 52 which is adapted to contact a bore surface 54 of the cylinder side wall 12. The primary seal member 50 also includes an inner face 56 which can be contacted by a backup or secondary seal means which can be an annular member 58 positioned in the seal groove 42 radially inwardly of the primary seal. It should be recognized, however, that other seal configurations or other types of seal elements may be provided in the seal groove 42. Several examples of such seal elements will be disclosed in the alternate embodiments discussed hereinafter. The seal members can be made from various suitable conventional types of plastics or synthetic or natural rubbers.

It should be noted that the secondary seal 58 is made of a resilient material and is so dimensioned in relation to the seal groove 42 as to provide a lubricant space 60 atop the secondary seal in the seal groove. This space is adapted to receive lubricant through the lubricant grooves 38.

With reference now again to FIG. 1, a layer of lubricant 70 is provided on the piston head top face 36 in order to lubricate the movement of the piston 30 in the cylinder 10 and to prevent inordinate wear of the primary seal member 50, which in order to further reduce wear can be made from a PTFE-type plastic material. It should be noted that the thickness of the lubricant layer 70 is exaggerated in FIG. 1 for ease of visibility. The lubricant can be a liquid such as a conventional hydraulic oil or the like. Alternatively, it can also be a conventional lubricating grease such as molybdenum disulfide or the like.

With the assembly of the present invention, additional lubricant can be added as needed simply by supplying the lubricant through the lubricant refill aperture 20 after removal of the plug 22.

As mentioned, the assembly A is utilized to pressurize a gas such a nitrogen gas. In this connection, a gas supply container 80 is connected to an inlet line 82 having therein a conventional check valve 84. The inlet line 82 leads to the cylinder top wall inlet and outlet aperture 18. After the gas has been pressurized, the gas can flow out through an outlet line 86 which branches off from the inlet line 82 adjacent the aperture 18. A conventional check valve 88 is positioned in the outlet line 86 in order to prevent a reverse flow of the pressurized gas. The flow of gas through outlet line 86 is controlled by a conventional directional valve 90 positioned downstream from the check valve 88.

Prior to the start of a gas compression cycle in the cylinder 10, the lubricant inlet plug 22 can be removed and a desired quantity of lubricant can be added through the lubricant refill aperture 20. If desired, the cylinder can be maintained in a vertical position so that a lubricant such as oil can cover the top face 36 of the piston head 32 and enter the lubricant grooves 38. If desired, the lubricant layer 70 can cover the piston head top face 36 to a depth of approximately $\frac{1}{4}$ to $\frac{1}{2}$ inch.

With lubricant covering the piston head top face 36, a gas such as nitrogen can be supplied from the gas supply 80 to the cylinder bore 16 through the gas supply line 82, passing through check valve 84, and gas inlet passage 18 while directional valve 90 remains in a closed position. The gas compression cycle is now ready to start. During compression, the piston 30 moves upwardly by a suitable conventional means, such as the schematically illustrated motor, compressing the gas in the cylinder to a high pressure thereby simultaneously forcing the lubricant at the same high pressure into the seal groove 42.

Figure 4:
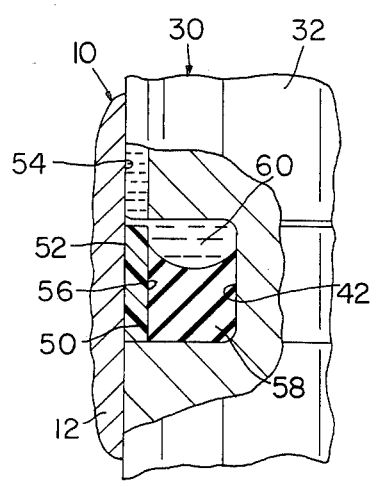
FIG. 4 is a side elevational view in partial cross section of the sealing groove and seal assembly of FIG. 3 in a pressurized condition.

As shown in FIG. 4, this enlarges the lubricant space 60 atop the resilient backup seal or secondary seal 58 by deforming the backup seal and forcing it more strongly against the inner face 56 of the primary seal member 50. Thus the outer face 52 of the primary seal member is urged more strongly against the bore surface 54 in order to reduce any leakage of either gas or the lubricant past the primary seal member. At the same time, the backup seal 58 is urged more strongly against a side wall and a base wall of the seal groove 42 to prevent lubricant from flowing therepast. As the primary seal member 50 moves against the bore surface 54, it is lubricated by the lubricant thereby increasing the life of the seal member 50 and of the piston and cylinder assembly A.

It should be noted that the piston 30 never moves high enough in the cylinder bore 16 to force the lubricant material out of the cylinder through the gas inlet and outlet passage 18. For example, if the cylinder chamber is approximately 10½ inches high, then the stroke of the piston in the cylinder would only be approximately 10 inches to allow an approximately ½ inch void at the top of the cylinder at the end of the compression stroke of the piston. In the case of such dimensions, the layer of lubricant atop the piston could be approximately ¼ inch thick thereby leaving at least a quarter inch gap between the top of the lubricant surface and the top of the cylinder.

It should also be noted that the assembly of the present invention is not meant to reciprocate quickly but rather relatively slowly so that the lubricant, if it be an oil or the like, will not be prone to misting as the piston 30 advances and retracts on the cylinder 10. Thus, although it is recognized that the gas which is meant to be pressurized will be heated as it is pressurized, it will not be hot enough to vaporize significant amounts of the lubricant on the top face of the piston head. In this connection a hydraulic oil which is usable up to at least 150° F. is preferred as the lubricant.

The pressurized gas which is produced by the assembly of the present invention can be utilized in a number of applications such as gas injection molding or the driving of air driven tools, such as a tack hammer or the like, as well as other conventional commercial uses.

After the compression stroke, the pressurized gas may exit through outlet line 86, past a check valve 88, after the directional valve 90 is placed in the open position.

FIG. 5 discloses a first alternate embodiment of the invention. For ease of illustration and appreciation of this modified construction, like components are identified by like numerals with a primed (') suffix and new components are identified by new numerals.

More particularly, FIG. 5 discloses a cylinder and piston assembly A' in which a piston head 32' located in a cylinder bor 16' is provided with a lubricant reservoir body 100 that is attached to the piston head by a suitable conventional fastener 102. In one preferred embodiment, the reservoir 100 may be a sintered metal disk, which when saturated in a pool lubricant oil 70', can act as an oil supply for the lubrication of the assembly.

As is evident, FIG. 5 illustrates a piston 30' as it is advancing in a cylinder 10' thus compressing the gas in the cylinder bore 16'. The compression of the gas also causes a pressurization of the lubricant 70' and compression of a resilient backup seal member 58' which forces a primary seal member 50' against the bore surface.

Figure 6:
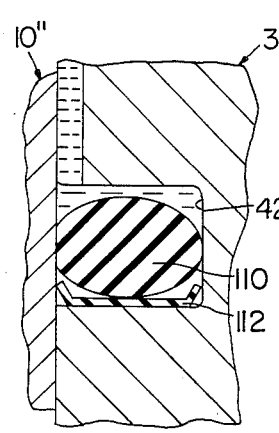
FIG. 6 is an enlarged side elevational view in cross section of a first alternate embodiment of a seal assembly and seal groove configuration according to the present invention; and, FIG. 7 is an enlarged side elevational view in cross section of a second alternate embodiment of a seal assembly and seal groove configuration according to the present invention.

FIG. 6 shows a second alternate embodiment of the invention. For ease of illustration and appreciation of this modified construction, like components are identified by like numerals with a double primed ('') suffix and new components are identified by new numerals.

More specifically, FIG. 6 illustrates a different type of seal structure positioned in a seal groove 42'' of a piston member 30'' which is adapted to reciprocate in a cylinder 10''. In this embodiment, an oval-shaped seal ring 110 of resilient material can be utilized as the primary seal member. The ring 110 can be seated on a "tray" 112 made of a relatively rigid material. As is evident, the seal ring 110 serves the roles of both the primary ring and the backup ring in this embodiment. The tray 112 prevents the extrusion of seal ring 110 into the gap between the cylinder wall and the piston outer periphery.

Figure 7:
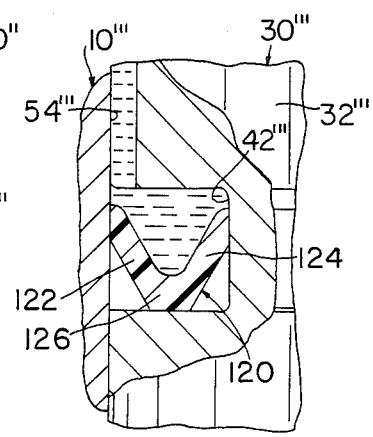

Alternatively, another type of sealing arrangement in which one suitably configured seal member assumes the roles of both the primary seal means and backup seal means can be provided as is illustrated in FIG. 7. In this modified construction, like components will be identified by like numerals with a triple primed (''') suffix and new components will be identified by new numerals.

More particularly, FIG. 7 illustrates that a seal groove 42''' of a piston 30''' reciprocating in a cylinder 10''' can be provided with a V-shaped or inverted chevron-shaped packing seal member 120 which includes an outer leg 122 adapted to contact a cylinder bore surface 54'''. The seal member 120 also includes an inner leg 124, which is adapted to contact the piston head 32''' adjacent a side wall of the seal groove 42''', and a base portion 126 which contacts a base wall of the seal groove. When the lubricant in the seal groove 42''', is pressurized, the seal member outer leg 122 is urged with greater force into contact with the cylinder bore surface 54'''. At the same time, the seal member inner leg 124 is urged with greater force into contact with the side wall of the groove 42'''. With pressure being exerted from above the seal member base portion 126, it is urged downwardly into contact with the seal groove base wall to prevent the leak of lubricant past the seal member.

It should also be recognized that a number of other conventional types of sealing elements can be positioned in the seal groove of the piston disclosed in the present invention. All that is important is that as the gas is pressurized by the piston in the cylinder, the lubricant also become pressurized to force the seal member into more intimate contact with the cylinder bore and the piston wall thereby to better serve as a seal in the assembly and keep the gas confined while also lubricating the seal member and the piston head and cylinder bore to prevent undue wear thereof.

Although the invention has been shown and described with respect to preferred and alternate embodiments, modifications and alterations thereof will occur to others upon reading and understanding of the specification. It is intended to include all such modifications and alterations insofar as they come within the scope of the claims or the equivalents thereof.

What is claimed is:

1. An apparatus for compressing a gas, comprising:
 a cylinder body having a longitudinally extending bore therein with a wall;
 a piston adapted for reciprocating movement in said cylinder bore, said piston including a piston head having a top face;
 a seal groove extending around a periphery of said piston head and spaced from said piston head top face;

at least one fluid passage extending to said seal groove;

a seal member positioned in said groove and having an outer face, adapted to contact said cylinder bore wall, and an inner face;

lubricant storage means mounted for movement with the piston head and having pores for receiving and retaining the lubricant therewithin, the pores being in communication with the fluid passage;

inlet means for allowing a gas to enter said cylinder above said piston, the pores being in communication with the gas above the piston; and, movement means for actuation of said piston upwardly to compress the gas, the compressed gas pressurizing the lubricant within the pores, a portion of the pressurized lubricant flowing from the pores through said fluid passage and into said seal groove to urge said seal against said cylinder bore wall and lubricate the bore wall.

2. The apparatus of claim 1 further comprising an outlet aperture located in said cylinder body for allowing the gas to exit said cylinder.

3. The apparatus of claim 1 wherein said storage means is made from sintered metal.

4. The apparatus of claim 1 wherein said lubricant is a liquid.

5. The apparatus of claim 4 wherein said lubricant liquid is a hydraulic oil.

6. The apparatus of claim 1 further comprising an inlet aperture in said cylinder which allows additional lubricant to be added to the storage means.

7. The apparatus of claim 1 further comprising a resilient backup seal member positioned in said groove and adapted to contact said seal member inner face.

8. The apparatus of claim 7 wherein said backup seal member is an annular ring.

9. The apparatus of claim 1 wherein four equally spaced fluid passages extend from said piston head top face to said seal groove, said passages being defined as grooves in the periphery of said piston head.

10. The apparatus of claim 1 wherein said seal member is an annular ring.

11. The apparatus of claim 10 wherein said seal member is an O-ring.

12. The assembly of claim 1 wherein said seal member comprises an annular V-shaped member having a first, outer, leg and a second, inner, leg.

13. The assembly of claim 1 wherein gas at pressures up to 10,000 to 20,000 PSI can be accomodated in said cylinder body and confined by said seal mebmer.

14. The assembly of claim 1 wherein said at least one fluid passage is defined as a groove extending along the periphery of said piston head.

15. A lubricant piston and cylinder gas pressurizing assembly, comprising:

a substantially vertically oriented cylinder body having a top wall and a longitudinally extending bore with an inner wall;

a substantially vertically oriented piston adapted for reciprocating motion in said cylinder bore, said piston including a piston head with a top end and a bottom end, a piston rod being secured to said piston head bottom end, said piston head top end having a substantially horizontally oriented top face;

a seal groove extending around a periphery of said piston head and spaced from said piston head top face;

a plurality of spaced fluid conducting grooves extending along said periphery of said piston head from said piston head top face to said seal groove;

an annular primary seal member positioned in said seal groove and having an outer face, adapted to contact said cylinder wall, and an inner face;

an annular resilient backup seal member positioned in said seal groove radially inwardly of said primary seal member and adapted to contact said inner face thereof as well as at least two walls of said seal groove;

a pool of a lubricant provided on said piston head top face;

refill means for allowing additional lubricant to be added on said piston head top face;

inlet means for allowing a gas to enter said cylinder above said piston; and, movement means for actuation of said piston upwardly to compress said gas and pressurize said lubricant, a portion fo said pressurized lubricant flowing through said fluid conducting grooves and into said seal groove to compress said backup seal member and thereby urge said primary seal member outer face against said cylinder inner wall.

16. The assembly of claim 15 wherein said primary seal member is a substantially rectangular body having a substantially flat outer face and said backup seal member has a body that is approximately rectangular in cross section.

17. The assembly of claim 15 wherein said lubricant is a liquid such as a hydraulic oil.

18. The assembly of claim 15 further comprising a storage means for storing the lubricant, said storage means being secured to said piston head.

19. The assembly of claim 15 wherein said refill means comprises a lubricant refill aperture provided in said cylinder top wall and a plug for selectively sealing said refill aperture.

* * * * *